(12) United States Patent
Hwang et al.

(10) Patent No.: US 11,200,642 B2
(45) Date of Patent: Dec. 14, 2021

(54) IMAGE SIGNAL PROCESSOR, OPERATION METHOD OF IMAGE SIGNAL PROCESSOR, AND ELECTRONIC DEVICE INCLUDING IMAGE SIGNAL PROCESSOR

(71) Applicant: SAMSUNG ELECTRONICS CO., LTD., Suwon-si (KR)

(72) Inventors: Mincheol Hwang, Seoul (KR); Bangyong Song, Yongin-si (KR); Ildo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 144 days.

(21) Appl. No.: 16/549,952

(22) Filed: Aug. 23, 2019

(65) Prior Publication Data

US 2020/0184607 A1 Jun. 11, 2020

(30) Foreign Application Priority Data

Dec. 6, 2018 (KR) .................. 10-2018-0155946

(51) Int. Cl.
*H04N 5/232* (2006.01)
*G06T 5/00* (2006.01)
(Continued)

(52) U.S. Cl.
CPC ............ *G06T 5/003* (2013.01); *G06T 3/4015* (2013.01); *G06T 5/002* (2013.01); *G06T 5/20* (2013.01);
(Continued)

(58) Field of Classification Search
CPC .................................................. H04N 5/23229
(Continued)

(56) References Cited

U.S. PATENT DOCUMENTS 7,551,793 B2 6/2009 Guangxi et al.
8,189,946 B2 5/2012 Ohira
(Continued)

FOREIGN PATENT DOCUMENTS

JP 2011141829 A 7/2011
JP 4931214 B2 5/2012
(Continued)

OTHER PUBLICATIONS

C. Tomasi and R. Manduchi, "Bilateral Filtering for Gray and Color Images,"x Proc. IEEE Int'l Computer Vision Conf., 1998.
(Continued)

*Primary Examiner* — Joel W Fosselman
(74) *Attorney, Agent, or Firm* — Volentine, Whitt & Francos, PLLC

(57) ABSTRACT

An image signal processor includes a first sharpening filter configured to perform a first filtering operation on a raw data output from an external image device to output first sharpness data. A second sharpening filter is configured to perform a second filtering operation on the raw data in parallel with the first filtering operation to output second sharpness data. An edge determiner is configured to determine an edge strength of an image corresponding to the raw data based on the raw data and to adjust a first weight and a second weight based on the determined edge strength. A combiner configured to combine first weight data in which the adjusted first weight is reflected in the first sharpness data and second
(Continued)

weight data in which the adjusted second weight is reflected in the second sharpness data to generate output data.

18 Claims, 13 Drawing Sheets

(51) Int. Cl.
| | |
|---|---|
| *G06T 5/20* | (2006.01) |
| *G06T 7/13* | (2017.01) |
| *G06T 7/40* | (2017.01) |
| *G06T 3/40* | (2006.01) |
| *H04N 9/73* | (2006.01) |
| *H04N 9/69* | (2006.01) |
| *H04N 9/67* | (2006.01) |

(52) U.S. Cl.
CPC .................. *G06T 7/13* (2017.01); *G06T 7/40* (2013.01); *H04N 5/23229* (2013.01); *H04N 9/67* (2013.01); *H04N 9/69* (2013.01); *H04N 9/735* (2013.01); *G06T 2207/20192* (2013.01)

(58) Field of Classification Search
USPC ...................................................... 348/223.1
See application file for complete search history.

(56) References Cited

U.S. PATENT DOCUMENTS

| | | | |
|---|---|---|---|
| 8,189,947 | B2 | 5/2012 | Lee |
| 8,737,758 | B2 | 5/2014 | Kim et al. |
| 9,384,411 | B2 | 7/2016 | Parkhomenko et al. |
| 9,412,152 | B2 | 8/2016 | Chen et al. |
| 9,585,636 | B2 | 3/2017 | Osumi et al. |
| 2009/0180707 | A1* | 7/2009 | Li ........................... G06T 5/004 |
| | | | 382/266 |
| 2016/0241779 | A1* | 8/2016 | Naruse ................... G06T 5/007 |

FOREIGN PATENT DOCUMENTS

| | | |
|---|---|---|
| KR | 0683060 B1 | 2/2007 |
| KR | 100901354 B1 | 6/2009 |
| KR | 101101441 B1 | 1/2012 |
| KR | 20150116833 A | 10/2015 |
| WO | WO2014052602 A1 | 4/2014 |

OTHER PUBLICATIONS

K. He, J. Sun, and X. Tang, "Guided Image Filtering," IEEE Trans. Pattern Anal. Mach. Intell., vol. 35, No. 6, pp. 1397-1409, Jun. 2013.

\* cited by examiner

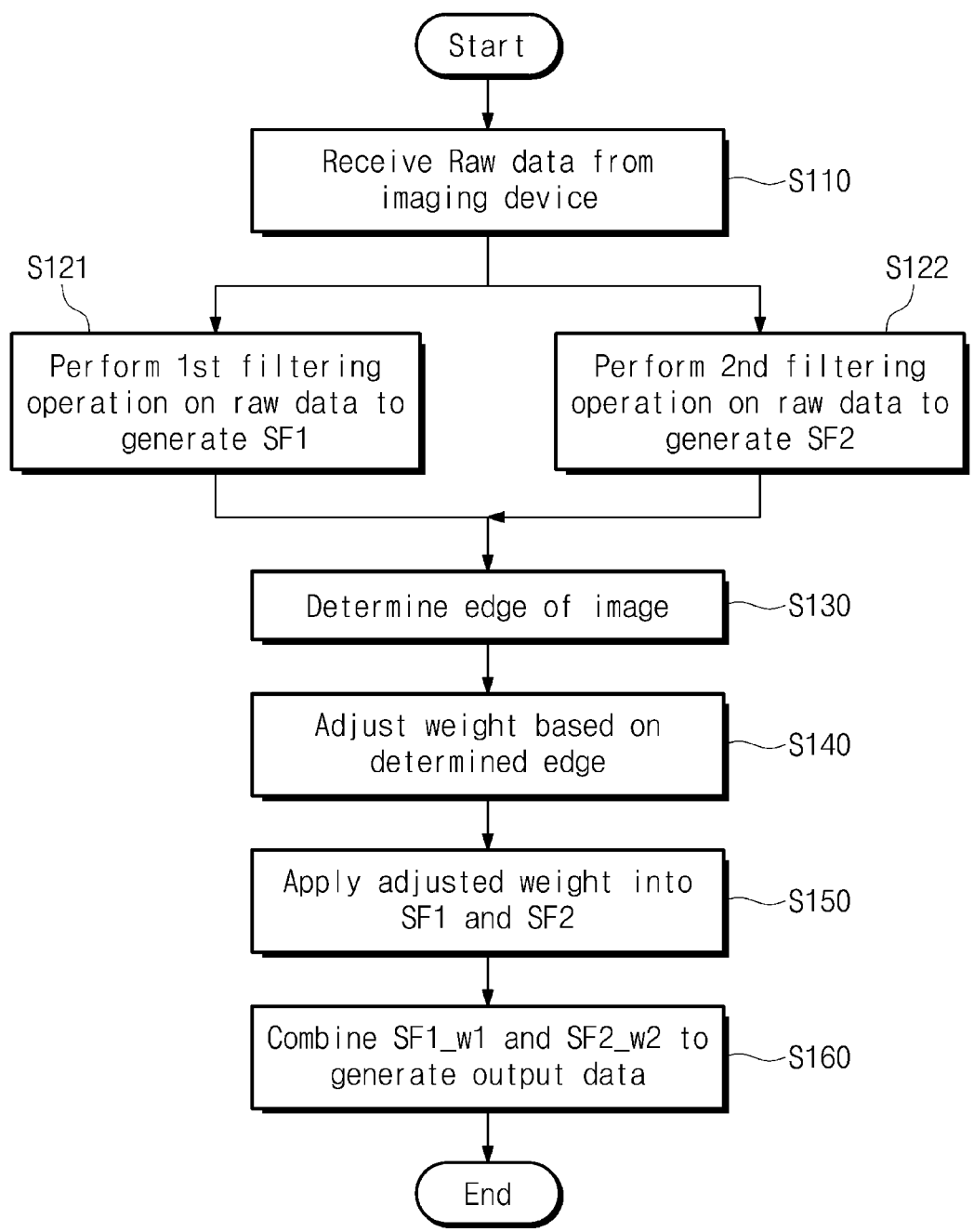

IMAGE SIGNAL PROCESSOR, OPERATION METHOD OF IMAGE SIGNAL PROCESSOR, AND ELECTRONIC DEVICE INCLUDING IMAGE SIGNAL PROCESSOR

CROSS-REFERENCE TO RELATED APPLICATION

This application claims the benefit of Korean Patent Application No. 10-2018-0155946, filed on Dec. 6, 2018, in the Korean Intellectual Property Office, the disclosure of which is incorporated herein in its entirety by reference.

BACKGROUND

The disclosure relates to an electronic device, and more particularly, to an image signal processor, an operation method of the same, and an electronic device including the same.

An image sensor included in a smart phone, a tablet personal computer (PC), or a digital camera acquires image information about an external object by converting light reflected from the external object into an electrical signal. The electrical signal acquired from the image sensor is converted into image information that is actually recognized by humans or various image signal processing operations that are performed to improve image quality.

As an example, various sharpening filters are used to improve sharpness of the image. Each of the sharpening filters has a unique characteristic. Due to such unique characteristics of the sharpening filters, quality in the sharpness in a specific region of the image may be improved, but the quality in the sharpness in another region of the image may be lowered or abnormal signals in another region of the image may be included. Accordingly, the overall quality of the image may be lowered.

SUMMARY

According to example embodiments of the disclosure, an image signal processor may include a first sharpening filter configured to perform a first filtering operation on raw data output from an external image device to output first sharpness data. A second sharpening filter is configured to perform a second filtering operation on the raw data in parallel with the first filtering operation to output second sharpness data. An edge determiner is configured to determine an edge strength of an image corresponding to the raw data based on the raw data and to adjust a first weight and a second weight based on the determined edge strength. A combiner is configured to combine first weight data in which the adjusted first weight is reflected in the first sharpness data and second weight data in which the adjusted second weight is reflected in the second sharpness data to generate output data.

According to example embodiments of the disclosure, an operation method of an image signal processor may include receiving raw data from an external image device, performing a first filtering operation on the whole of the raw data to generate first sharpness data, performing a second filtering operation on the whole of the raw data to generate second sharpness data, adjusting a first weight and a second weight based on an edge strength of an image corresponding to the raw data, reflecting the determined first and second weights in the first and second data, respectively, to generate first weight data and second weight data, combining the first weight data and the second weight data to generate output data, and storing the output data.

According to example embodiments of the disclosure, an electronic device may include an image device configured to convert light reflected from an external object into an electrical signal to output raw data. An image signal processor is configured to perform an image processing operation based on the raw data to generate output data. A system memory is configured to store the output data. The image signal processor may include a demosaic module configured to convert the raw data into full-color data. A multiple-sharpening filter is configured to perform a first filtering operation on the raw data to output first sharpness data and perform a second filtering operation on the raw data to output second sharpness data. An edge determiner is configured to determine an edge strength of an image corresponding to the raw data and adjust a first weight and a second weight based on the determined edge strength. A combiner is configured to combine first weight data in which the determined first weight is reflected in the first sharpness data, second weight data in which the determined second weight is reflected in the second sharpness data, and the full-color data to generate the output data.

According to example embodiments of the disclosure, an electronic device may include a first filter circuit that filters first data to generate first filtered data, a second filter circuit that filters second data to generate second filtered data, and a weighting circuit that applies a first weight to the first filtered data to generate weighted first filtered data and applies a second weight to the second filtered data to generate weighted second filtered data. A combiner combines the weighted first filtered data and weighted second filtered data.

BRIEF DESCRIPTION OF THE DRAWINGS

Exemplary embodiments of the disclosure will be more clearly understood from the following detailed description taken in conjunction with the accompanying drawings in which:

FIG. 3 is a flow chart of an operation of an image signal processor of FIGS. 1 and 2 according to example embodiments of the disclosure;

DETAILED DESCRIPTION OF THE EMBODIMENTS

Various example embodiments will be described more fully with reference to the accompanying drawings in which some embodiments are shown. However, the disclosures may be embodied in many alternate forms and should not be construed as limited only to the embodiments set forth herein.

Figure 1:
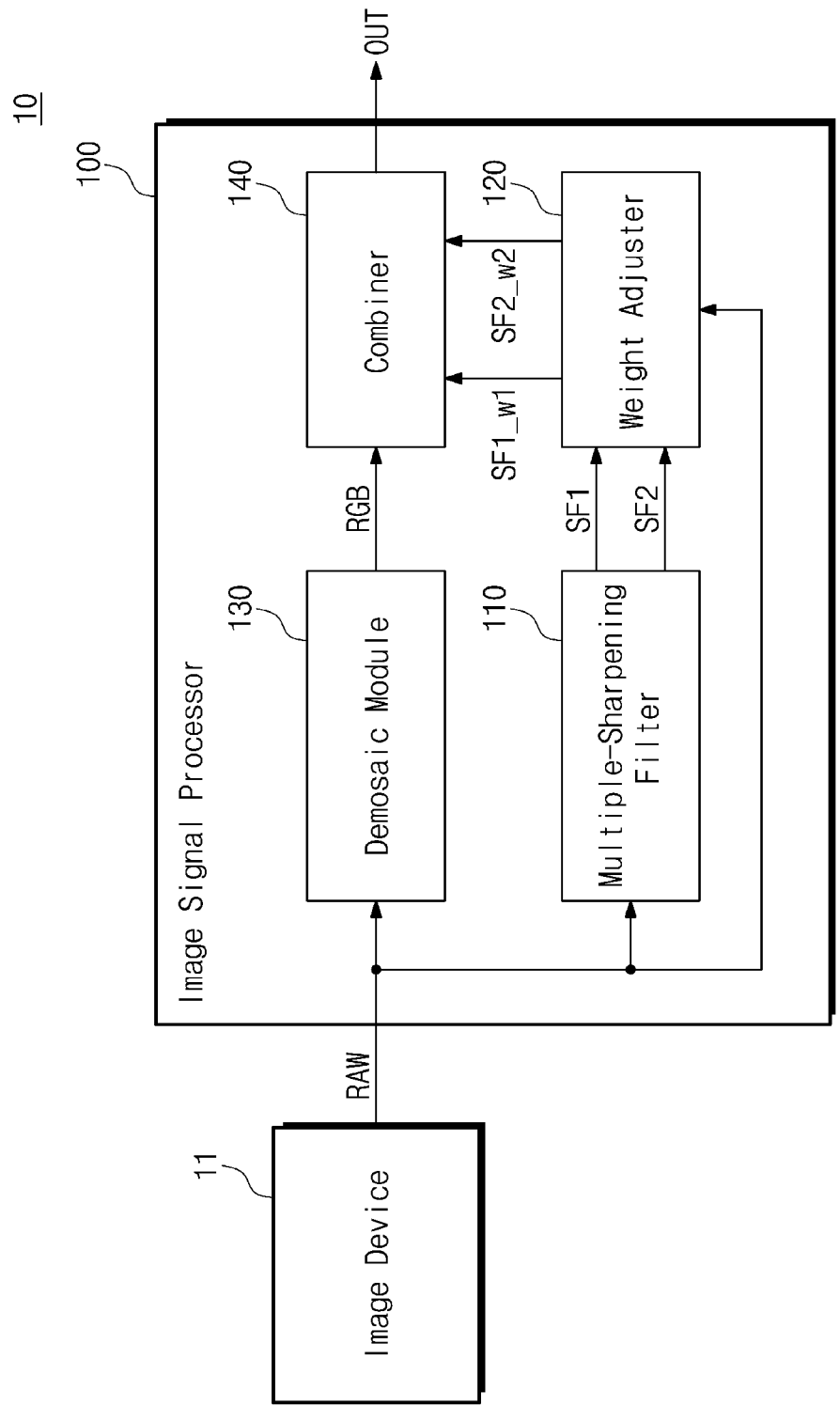
FIG. 1 is a block diagram of an image system according to example embodiments of the disclosure.

FIG. 1 is a block diagram of an image system according to example embodiments of the disclosure.

Referring to FIG. 1, an image system 10 may include an image device 11 and an image signal processor (ISP) 100. In some embodiments, the image system 10 may be any of various electronic devices, such as a smart phone, a tablet PC, digital camera, or the like, for acquiring image information on an object from the outside.

The image device 11 may be configured to convert light reflected from an external object into an electrical signal. The image device 11 may be configured to output the converted electrical signal as a raw data RAW. At that time, the raw data RAW output from the image device 11 may have a specific format according to a configuration of the image device 11. For example, when the image device 11 includes a color filter array CFA of a Bayer pattern, the raw data RAW output from the image device 11 may have a Bayer format including image information according to the Bayer pattern.

Hereinafter, for convenience of explanation, the term "data" is used. As used herein, the term "data" may refer to data including various information about one image (e.g., photograph). Hereinafter, an operation of the image signal processor 100 for one image will be described.

The image signal processor 100 may be configured to perform various signal processing operations on the raw data RAW from the image device 11 to generate output data having improved image quality. The image signal processor 100 may include a multiple-sharpening filter 110, a weight adjuster 120, a demosaic module 130, and a combiner 140.

The multiple-sharpening filter 110 may be configured to perform first and second sharpening filtering operations on the raw data RAW to output a first sharpening filtered data SF1 (hereinafter, referred to as a first sharpness data) and a second sharpening filtered data SF2 (hereafter, referred to as a second sharpness data). For example, the first sharpening filtering operation may refer to a sharpening filtering operation based on a spatial invariant filtering scheme and the second sharpening filtering operation may refer to a sharpening filtering operation based on an edge-preserving filtering scheme.

In some embodiments, the spatial filtering scheme may provide optimal sharpness data to a strong edge but may not provide normal sharpness data to a weak edge (e.g., a portion where an edge strengthen is weak, for example, a texture portion or a detailed portion).

The edge-preserving filtering scheme may provide optimal sharpness data to a weak edge but may provide abnormal sharpness data (e.g., data containing stair phenomenon) to the strong edge.

In some embodiments, the strong edge may refer to a portion where a difference in values of adjacent pixels is equal to or greater than a reference value and the edge may refer to a portion where a difference in values of adjacent pixels is less than a reference value or within a specific range.

The weight adjuster 120 may adjust magnitudes of first and second weights w1 and w2 to be applied to first and second sharpness data SF1 and SF2, respectively, received from the multiple-sharpening filer 110 based on the raw data (RAW). For example, the weight adjuster 120 may determine an edge strength of the image corresponding to the raw data RAW based on the raw data RAW. In some embodiments, the weight adjuster 120 may determine the edge strength of the image through an edge map or a local variance based on the raw data RAW. The weight adjuster 120 may adjust the magnitudes of the first and second weights w1 and w2 based on the determined edge strength.

In some embodiments, when the determined edge strength is equal to or greater than the reference value, the first sharpness data SF1 may be reflected in a final output data OUT by increasing the magnitude of the first weight w1. When it is determined the edge strength is less than the reference value, the second sharpness data SF2 may be reflected in the final output data OUT by increasing the magnitude of the second weight w2.

In other words, in a region where the strength of edge information is equal to or greater than the reference value (or in a region where the edge strength is strong), the first sharpness data SF1 may be applied and in a region where the strength of the edge information is less than the reference value (or in a region where the edge strength is weak, for example, a texture region or detailed region), the second sharpness data SF2 may be applied.

The demosaic module 130 may be configured to convert the raw data RAW into a full-color data RGB. For example, as described above, the raw data RAW may be data according to the pattern (e.g., Bayer pattern) of the color filter array CFA included in the image device 11. The demosaic module 130 may convert the raw data RAW from the image device 11 (i.e., data having the Bayer format) into the full-color data RGB.

The full-color data RGB, the first sharpness data SF1_w1 in which the first weight w1 is reflected (hereinafter, referred to as "a first weight data") and the second sharpness data SF2_w2 in which the second weight w2 is reflected (hereinafter, referred to as "a second weight data") may be combined with one another in the combiner 140 and output by the combiner 140 as the final output data OUT.

For example, as described above, since the first weight w1 increases for the strong edge, the first weigh data SF1_w1 may have a greater value for the strong edge than the second weight data SF2_w2. In this case, by adding the first and second weight data SF1_w1 and SF2_w2 to the full-color data RGB, the strong edge may be highlighted more clearly by the first weight data SF1_w1. The sharpness of the strong edge may be improved by the first weight data SF1_w1. In contrast, since the second weight w2 increases for the weak edge, the second weight data SF2_w2 may have a greater value for the weak edge than the first weight data SF1_w1. In this case, by adding the first and second weights SF1_w1 and SF2_w2 to the full-color data RGB, the weak edge may be highlighted more clearly by the second weight data SF2_w2. The sharpness of the weak edge may be improved by the second weight data SF2_w2.

In some embodiments, the first weight data SF1_w1 and the second weight data SF2_w2 may include information related to Y (i.e., brightness) of a YUV format. An edge of the output data OUT may be highlighted according to a size of a "Y" value. The combiner 140 may be configured to convert the full-color data RGB into the "YUV" format and to combine the "YUV" format with the first and second weight data SF1_w1 and SF2_w2, or the combiner 140 may be configured to convert the first and second weight data SF1_w1 and SF2_w2 into the "RGB" format and to combine the "RGB" format with the full-color data RGB.

As described above, the image signal processor 100 according to the disclosure may perform the first and second sharpening filtering operations on the raw data RAW to generate the first and second sharpness data SF1 and SF2 and may adjust the weights applied to the first and second sharpness data SF1 and SF2 depending on the edge strength of the image, such that the image quality (e.g., sharpness) of the output data OUT may be improved.

Figure 2:
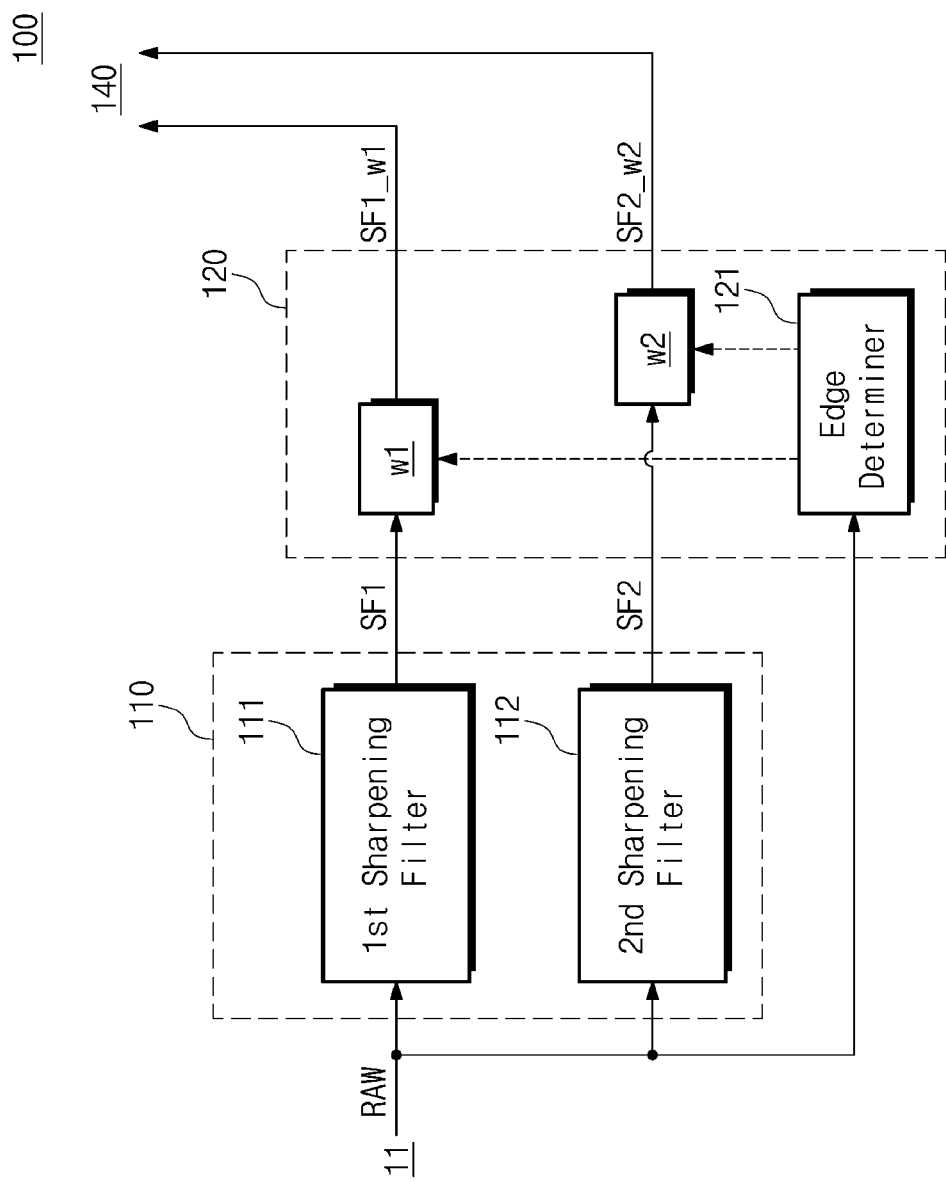
FIG. 2 is a block diagram of an image signal processor of FIG. 1 according to example embodiments of the disclosure.

FIG. 2 is a block diagram of an image signal processor of FIG. 1 according to example embodiments of the disclosure.

Referring to FIGS. 1 and 2, the multiple-sharpening filter 110 may include first and second sharpening filters 111 and 112. The first sharpening filter 111 may be configured to perform the first filtering operation on the raw data RAW to output the first sharpness data SF1. The second sharpening filter 112 may be configured to perform the second filtering operation on the raw data RAW to output the second sharpness data SF2.

In some embodiments, the first sharpening filter 111 may be the spatial invariant filter and the second sharpening filter 112 may be the edge-preserving filter. In some embodiments, the edge-preserving filter may include a bilateral filter, a guided filter, or the like.

The weight adjuster 120 may include the first and second weights w1 and w2 and an edge determiner 121. The first weight w1 and the second weights w2 may be applied to the first sharpness data SF1 and the second sharpness data SF2, respectively.

The edge determiner 121 may be configured to determine the edge strength about the image, based on the edge map or the local variance on the raw data RAW. The edge determiner 121 may be configured to adjust values of the first and second weights w1 and w2 based on the determined edge strength. For example, when the determined edge strength is equal to or greater than the reference value, the edge determiner 121 may set the value of the first weight w1 greater than that of the second weight w2 or may set the value of the first weight w1 to "1" and the value of the second weight w2 to "0". Whereas, when the determined edge strength is less than the reference value, the edge determiner 121 may set the value of the second weight w2 greater than that of the first weight w1 or may set the value of the second weight w2 to "1" and the value of the first weight w1 to "0".

In other words, for the region where the edge strength is strong, the size of the first weight w1 may be increased to reflect the first sharpness data SF1 in the output data OUT and, for the region where the edge strength is weak, the size of the second weight w2 may be increased to reflect the second sharpness data SF2 in the output data OUT. In some embodiments, the region with the strong edge strength may be the edge region and the region with the weak edge strength may be the texture region or the detailed region. The first weight data SF1_w1 and the second weight data SF2_w2 may be provided to the combiner 140. The combiner 140 may combine the first and second weight data SF1_w1 and SF2_w2, thus outputting the output data OUT.

As described above, the edge determiner 121 of the weight adjuster 120 may determine the edge strength of the image based on the raw data RAW, but the disclosure is not limited thereto. For example, the edge determiner 121 may be configured to determine the edge strength of the image based on the first sharpness data SF1 that is output from the first sharpening filter 111 or the second sharpness data SF2 that is output from the second sharpening filter 112.

FIG. 3 is a flow chart of an operation of an image signal processor of FIGS. 1 and 2 according to example embodiments of the disclosure.

Referring to FIGS. 1 to 3, in step S110, the image signal processor 100 may receive the raw data RAW from the image device 11. As aforementioned, the raw data RAW may have the data format according to the color filter array CFA of the image device 11. In some embodiments, the raw data RAW may have the Bayer format.

In step S121, the image signal processor 100 may perform the first filtering operation on the raw data RAW, thus generating the first sharpness data SF1. For example, the image signal processor 100 may generate the first sharpness data SF1 by performing the first filtering operation on the raw data RAW through the first sharpening filter 111.

In step S122, the image signal processor 100 may perform the second filtering operation on the raw data RAW, thus generating the second sharpness data SF2. For example, the image signal processor 100 may generate the second sharpness data SF2 by performing the second filtering operation on the raw data RAW through the second sharpening filter 112.

In some embodiments, the first sharpening filter 111 may be the filter operating based on the spatial invariant filtering scheme and the second sharpening filter 112 may be the filter operating based on the edge-preserving filtering scheme. In some embodiments, the first sharpening filter 111 may be a linear filter and the second sharpening filter 112 may be a nonlinear filter.

In some embodiments, the filtering operations in step S121 and step S122 may be performed in parallel on the raw data RAW. The filtering operations in step S121 and step S122 may be performed simultaneously or separately on the raw data RAW.

In some embodiments, each of the filtering operations in step S121 and step S122 may be performed on the entirety of the raw data RAW. The first sharpness data SF1 and the second sharpness data SF2 generated by the filtering operations in step S121 and step S122 may each include the sharpness data about an overall region of one image. One image may refer to image information expressed across a whole space, such as one picture or image of one frame.

In step S130, the image signal processor 100 may determine the edge strength of the image. For example, the edge determiner 121 of the image signal processor 100 may generate the edge map of the image on the basis of the received raw data RAW and may determine edge information of the image on the basis of the generated edge map. Or, the edge strength of the image may be determined by calculating local variance based on the received raw data RAW. However, the disclosure is not limited thereto. The image signal processor 100 may determine the edge strength of the image based on various schemes.

In step S140, the image signal processor 100 may adjust the weight on the basis of the determined edge strength. For example, when the edge strength determined by the edge determiner 121 of the image signal processor 100 is equal to or greater than the reference value, the edge determiner 121 may increase the value of the first weight w1 or may reduce the value of the second weight w2. Or, when the determined edge strength is equal to or greater than the reference value, the edge determiner 121 may set the value of the first weight w1 to "1" and may set the second weight w2 to "0".

When the determined edge strength is less than the reference value, the edge determiner 121 may reduce the value of the first weight w1 and may increase the value of the second weight w2. Or, when the determined edge strength is less than the reference value, the edge determiner 121 may set the value of the first weight w1 to "0" and may set the value of the second weight w2 to "1.

In some embodiments, the edge strength of the determined image information that is equal to or greater than the reference value may mean that the edge in the image is strongly expressed and the edge strength of the determined image information that is less than the reference value may mean that the edge in the image is weakly expressed. In some embodiments, the first and second weights w1 and w2 may be configured to meet Equation 1.

$$w1=1-w2 \quad \text{[Equation 1]}$$

As shown in Equation 1, as the first weight w1 increases according to the edge strength, the second weight w2 may decrease and, as the second weight w2 increases, the first weight w1 may decrease.

In some embodiments, the operations in step S130 and step S150 may be performed in parallel with the operations in step S121 and step S122. The determining operation for the edge strength and the weight adjustment operation in step S130 and step S150 may be performed in parallel with the filtering operations in step S121 and step S122.

In step S150, the image signal processor 100 may apply the adjusted first and second weights w1 and w2 to the first and second sharpness data SF1 and SF2. The image signal processor 100 may reflect the adjusted first and second weights w1 and w2 in the first and second sharpness data SF1 and SF2, respectively, thus generating the first weight data SF1_w1 and the second weight data SF2_w2.

In step S160, the image signal processor 100 may combine the generated first and second weight data SF1_w1 and SF2_w2, thus generating the output data OUT. In some embodiments, the output data OUT may be provided to an external memory (e.g., system memory or storage device) to be stored or may be provided to a display device to be displayed to a user.

As aforementioned, the image signal processor 100 according to example embodiments of the disclosure may perform the first and second filtering operations on the raw data RAW output from the image device 11 to generate the first and second sharpness data SF1 and SF2 and may differently reflect the first and second sharpness data SF1 and SF2 in the output data OUT, based on the edge information of the image. Accordingly, the overall sharpness of the final output image may be improved.

Figure 4A:
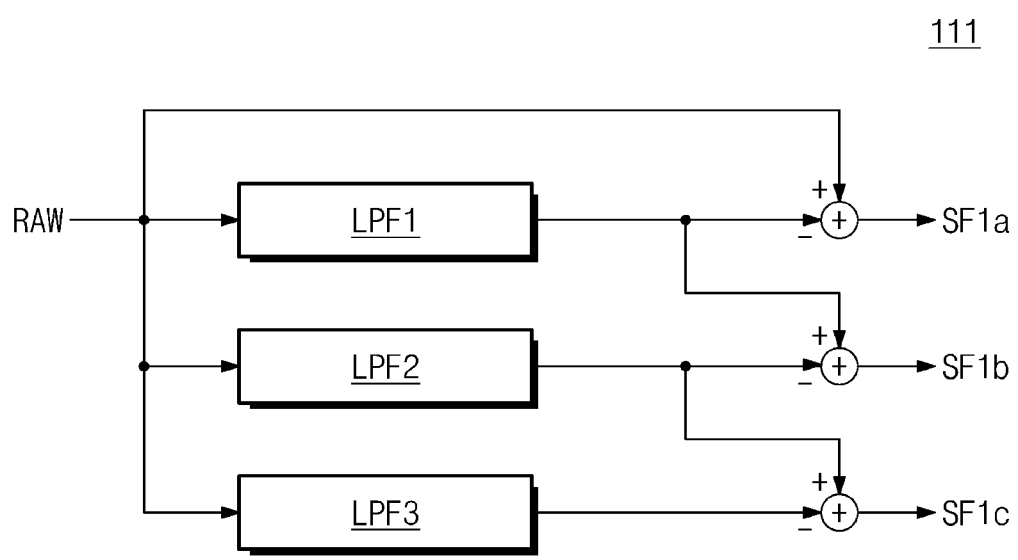
FIGS. 4A, 4B and 4C are views illustrating a first sharpening filter of FIG. 2 according to example embodiments of the disclosure.
Figure 4B:
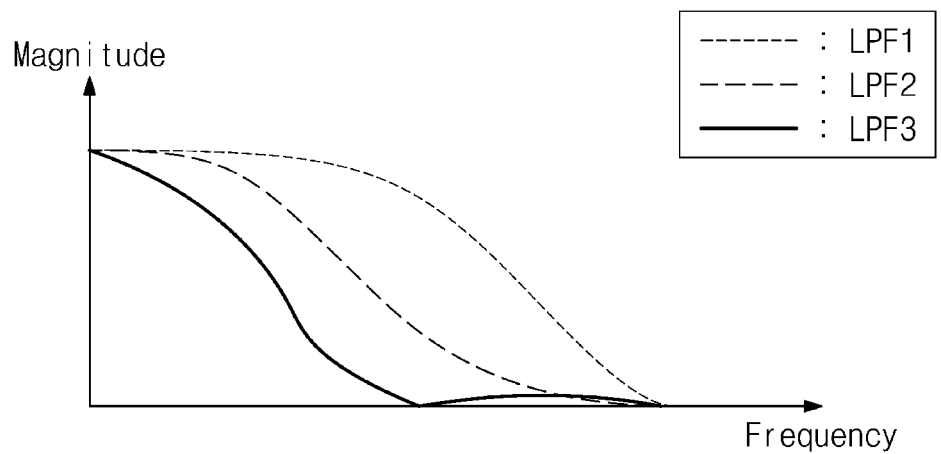
Figure 4C:
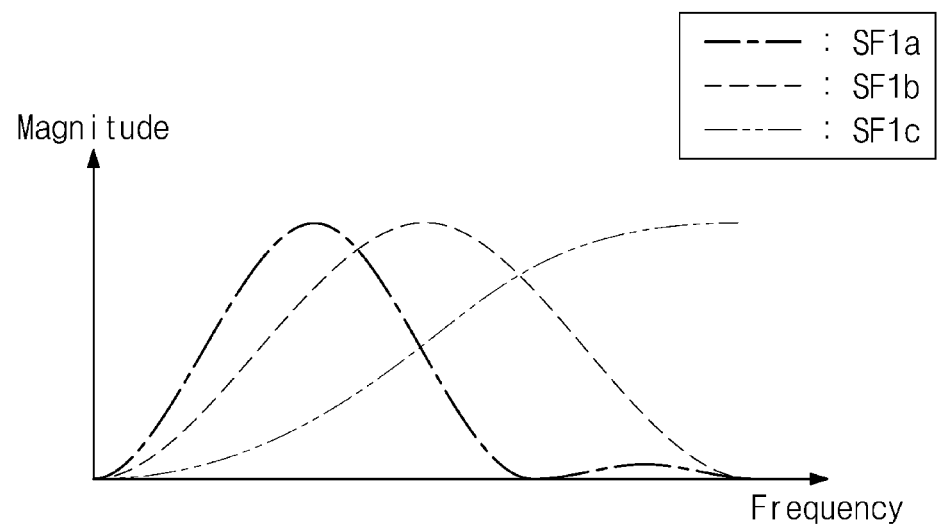

FIGS. 4A, 4B and 4C are views illustrating a first sharpening filter of FIG. 2 according to example embodiments of the disclosure. The first sharpening filter 111 shown in FIG. 4A is exemplary and the disclosure is not limited thereto.

Referring to FIGS. 4A to 4C, the first sharpening filter 111 may include first, second, and third low pass filters LPF1, LPF2, and LPF3. The first to third low pass filters LPF1, LPF2, and LPF3 may have frequency characteristics as shown in FIG. 4B. A signal pass band of the first low pass filter LPF1 may be wider than a signal pass band of the second low pass filter LPF2, and the signal pass band of the second low pass filter LPF2 may be wider than a signal pass band of the third low pass filter LPF3.

Each of the first to third low pass filters LPF1, LPF2, and LPF3 may be configured to perform the filtering operation on the raw data RAW. A difference between the raw data RAW and a filtering value of the first low pass filter LPF1 may be a sharpness data SF1a. A difference between the filtering value of the first low pass filter LPF1 and a filtering value of the second low pass filter LPF2 may be a sharpness data SF1b. A difference between the filtering value of the second low pass filter LPF2 and a filtering value of the third low pass filter LPF3 may be a sharpness data SF1c. The multiple sharpness data SF1a, SF1b, and SF1c generated from the first sharpening filter 111 may be combined with one another to generate the first sharpness data SF1, or one of the multiple sharpness data SF1a, SF1b, and SF1c may be selected to generate the first sharpness data SF1.

In some embodiments, each of the multiple sharpness data SF1a, SF1b, and SF1c may have a frequency characteristic as shown in FIG. 4C. As shown in FIG. 4C, the multiple sharpness data SF1a, SF1b, and SF1c may have different frequency characteristics. In such frequency characteristics, the sharpness data may be normally generated in the region where the edge strength of the image is strong, whereas the sharpness data may not be normally generated in the region (e.g., texture region or detailed region) where the edge strength of the image is weak. In other words, the first sharpening filter 111 may be the filter generating an optimal sharpness data for the region where the edge strength of the image is strong (e.g., the region where the edge strength of the image is equal to or greater than the reference value).

In some embodiments, the second sharpening filter 112 may be the filter generating an optimal sharpness data in the region (e.g., texture region or detailed region) where the edge strength of the image is weak, unlike the first sharpening filter 111. In some embodiments, the second sharpening filter 112 may be implemented as a bilateral filter expressed as Equation 2

$$BF(g)_p = \frac{1}{k_p} \sum_p G_{\sigma_s}(\|p-q\|)G_{\sigma_r}(\|g_p - g_q\|)g_p \quad \text{[Equation 2]}$$

Referring to Equation 2, $BF(g)_p$ is a function indicating the second sharpening filter 112, $1/k_p$ is a leveling factor (or, a normalizing factor), $G_{\sigma_s}$ is a spatial weight function, $G_{\sigma_r}$ is a range weight function, and $g_p$ indicates image data (i.e., raw data). The second sharpening filter 112 may perform the filtering operation based on Equation 2 to generate the second sharpness data SF2. In some embodiments, the second sharpening filter 112 may adjust the spatial weight and the range weight to adjust the characteristics of the second sharpness data SF2.

In some embodiments, when the various factors of the second sharpening filter 112 are applied equally to the overall region of the image, the sharpness data may be normally generated in the region (e.g., texture region or detailed region) with the low edge strength, whereas the sharpness data may not be normally generated in the region with the strong edge strength. For example, the abnormal signal such as the stair phenomenon may be generated in the region where the edge strength of the image is high.

In other words, the first sharpening filter 111 may generate the optimal sharpness data in the region where the edge region is strong, and the second sharpening filter 112 may generate the optimal sharpness data in the region where the edge region is weak.

Figure 5:
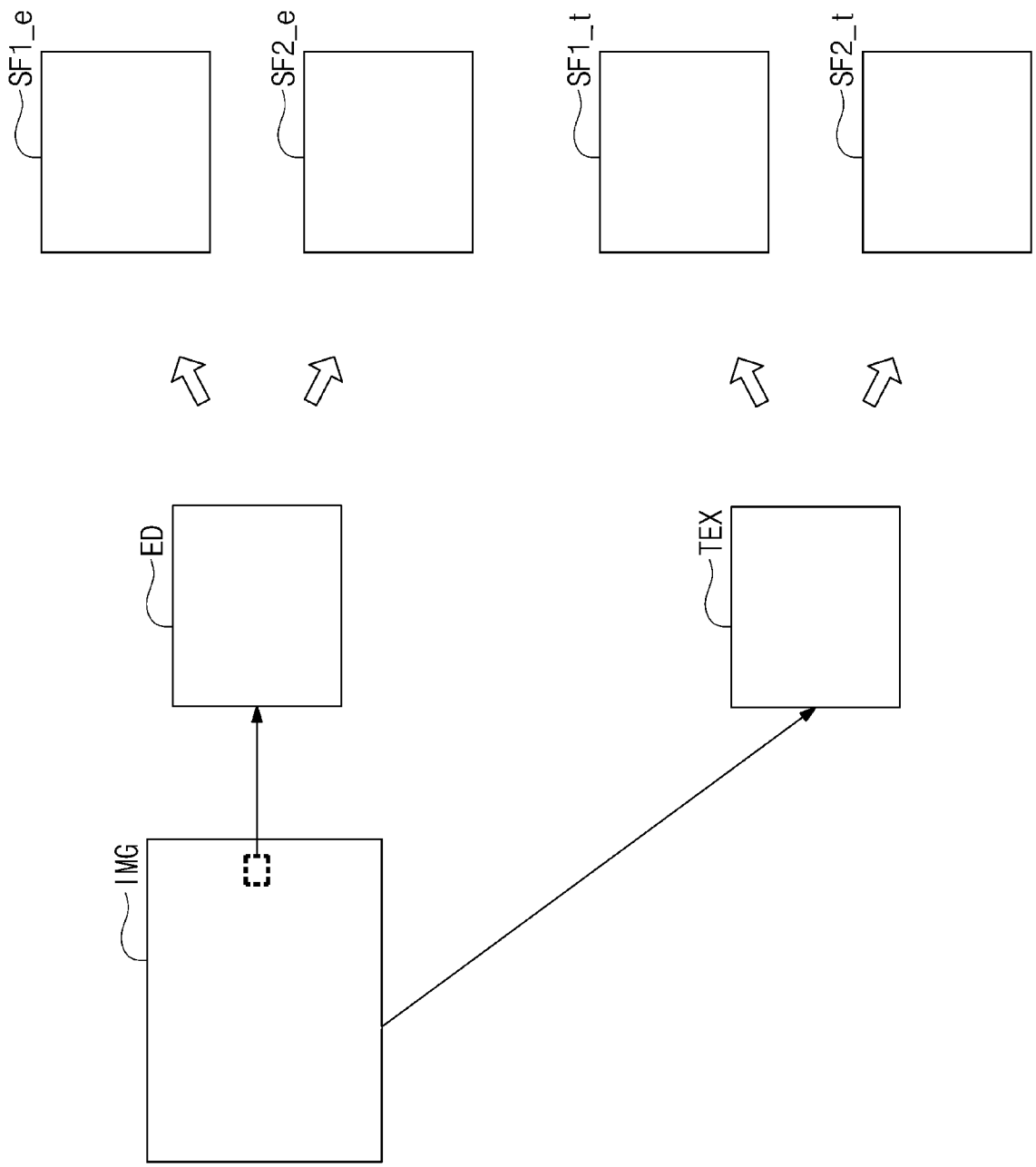
FIG. 5 is a view illustrating characteristics of first and second sharpening filters of FIG. 2 according to example embodiments of the disclosure.

FIG. 5 is a view illustrating characteristics of first and second sharpening filters of FIG. 2 according to example embodiments of the disclosure. To easily describe the characteristics of the first and second sharpening filters 111 and 112 according to example embodiments, the operations of the first and second sharpening filters 111 and 112 for specific regions of one image are described, but the disclosure is not limited thereto. For example, each of the first and second sharpening filters 111 and 112 may perform the filtering operation on the overall region of the image, based on the raw data RAW.

Referring to FIGS. 2 and 5, the raw data RAW from the image device 11 may include information about an image IMG shown in FIG. 5. The image IMG may be displayed through a separate display device by performing signal processing on the raw data RAW.

The image IMG may be illustrated as a full-color image as shown in FIG. 5, but the disclosure is not limited thereto. For example, each of the first and second sharpening filters 111 and 112 may perform the filtering operation on the overall region of the image IMG, based on the raw data RAW.

Regions included in the image IMG may include regions with various edge strengths. For example, an edge region ED included in the image IMG may be a region including a strong edge. The strong edge may indicate that a value difference between adjacent pixels is equal to or greater than the reference value. When the first sharpening filter 111 performs the filtering operation on the edge region ED, first sharpness edge data SF1_e may be generated, as shown in FIG. 5. When the second sharpening filter 112 performs the filtering operation on the edge region ED, a second sharpness edge data SF2_e may be generated, as shown in FIG. 5.

As shown in FIG. 5, the first sharpness edge data SF1_e may clearly express the strong edge of the image IMG in the edge region ED, whereas the second sharpness edge data SF2_e may express an abnormal signal about the strong edge of the image IMG in the edge region ED. In other words, when the second edge data SF2_e is reflected in the edge region ED or it is reflected more strongly than the first sharpness data SF1_e in the edge region ED, the image (i.e., output data OUT) IMG may include the abnormal signal in the edge region ED. In this case, the whole sharpness quality of the image (i.e., output data OUT) IMG may be lowered.

A texture region TEX among the regions included in the image IMG may be a region including a weak edge. The weak edge may indicate that a value difference between adjacent pixels is less than the reference value. In some embodiments, the weak edge may indicate that a value difference between adjacent pixels is within a specific range. When the first sharpening filter 111 performs the filtering operation on the texture region TEX, first sharpness texture data SF1_t may be generated as shown in FIG. 5. When the second sharpening filter 112 performs the filtering operation on the texture region TEX, second sharpness texture data SF2_t may be generated as shown in FIG. 5.

As shown in FIG. 5, the first sharpness texture data SF1_t may not accurately express the weak edges in the texture region TEX. The second sharp texture data SF2_t may accurately express the weak edges in the texture region TEX. In other words, in the texture region TEX, when the first sharpness texture data SF1_t is reflected or is reflected more strongly than the second sharpness texture data SF2_t, the image (i.e., output data OUT) IMG may not accurately express the weak edges. In this case, the whole sharpness of the image (i.e., output data OUT) IMG may be lowered.

As aforementioned, when a specific one sharpening filter is used, the sharpness quality of a specific region (e.g., one of the edge region and the texture region) among multiple regions included in one image IMG may be improved, but the sharpness quality of the other regions (e.g., the other one of the edge region and the texture region) may be lowered.

The image signal processor 100 according to example embodiments of the disclosure may perform each of the first and second filtering operations on the entirety of the image corresponding to the raw data RAW based on the raw data RAW to generate a corresponding one of the first and second sharpness data SF1 and SF2 and may adjust the weights applied to the first and second sharpness data SF1 and SF2 on the basis of the edge strength (e.g., edge map, or edge strength based on the local variance) of the image corresponding to the raw data RAW to thereby generate the output data (i.e., final image) OUT. Accordingly, the image signal processor having improved performance and its operation method may be provided.

Figure 6:
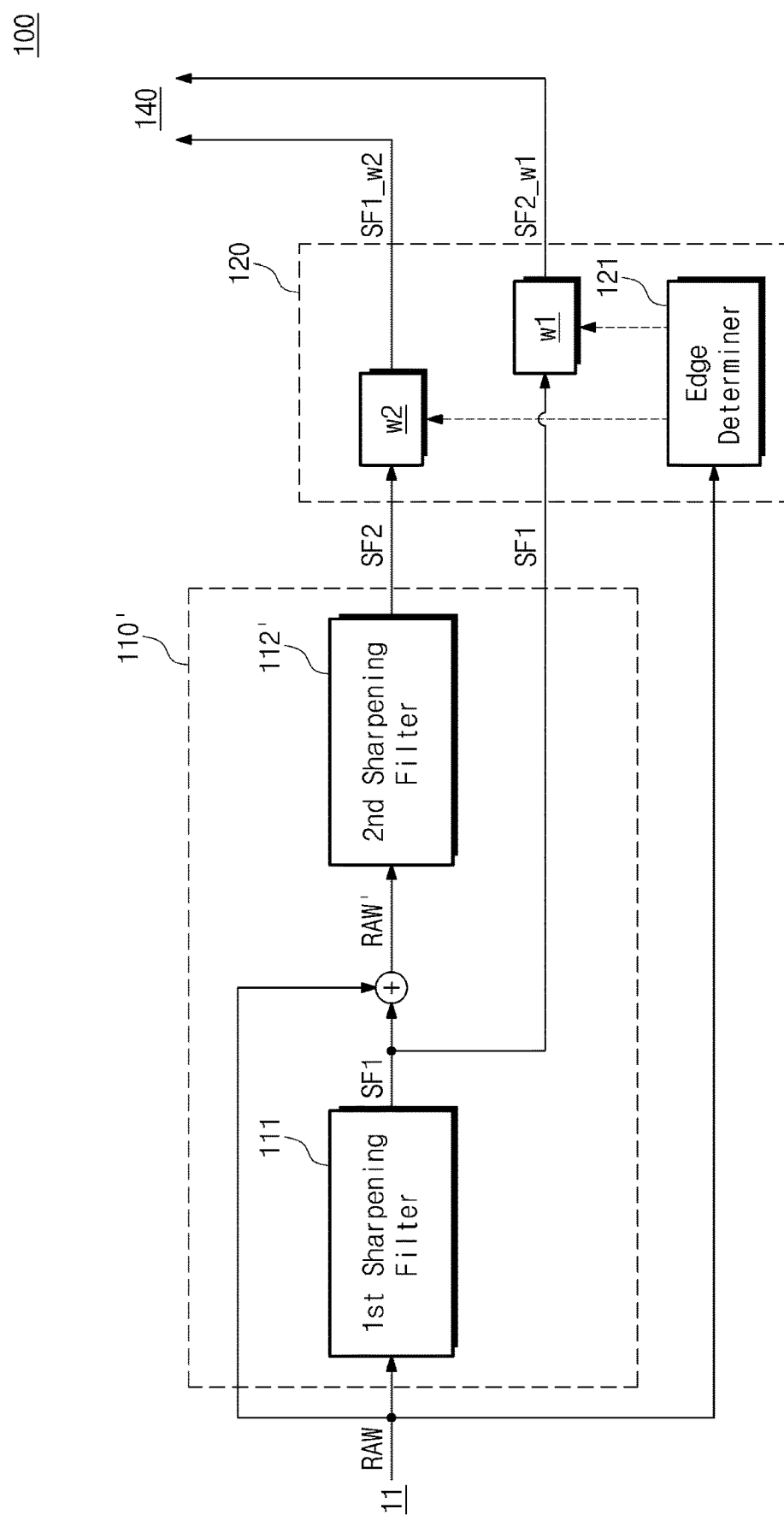
FIG. 6 is a block diagram of an image signal processor of FIG. 1 according to example embodiments of the disclosure.

FIG. 6 is a block diagram of an image signal processor of FIG. 1 according to example embodiments of the disclosure.

Referring to FIGS. 1 and 6, the multiple-sharpening filter 110' may include the first and second sharpening filters 111 and 112'. The weight adjuster 120 may include the edge determiner 121. The edge determiner 121 may be configured to adjust the first and second weights w1 and w2.

The second sharpening filter 112' may perform a filtering operation based on a modified raw data RAW, unlike the second sharpening filter 112 of FIG. 2. For example, the first sharpening filter 111 may perform the filtering operation based on the raw data RAW, thus generating the first sharpness data SF1. The modified raw data RAW' may be generated by subtracting the first sharpness data SF1 from the raw data RAW. That is, the modified raw data RAW' may be the raw data without the strong edge (i.e., a raw data from which the strong edge has been removed).

The second sharpening filter 112' may perform the filtering operation on the modified raw data RAW, thus outputting the second sharpness data SF2. The second sharpening filter 112' may perform the filtering operation on the modified raw data RAW' (where the strong edge has been removed), thus generating the second sharpness data SF2 for the region (e.g., texture region or detailed region) other than the strong edge. In some embodiments, the first and second sharpening filters 111 and 112' may each perform the filtering operation on the overall region of the image corresponding to the raw data RAW.

After the first and second sharpness data SF1 and SF2 output from the multiple-sharpening filter 110' are multiplied with the first and second weights w1 and w2, respectively, the resulting data may be provided to the combiner 140.

Figure 7:
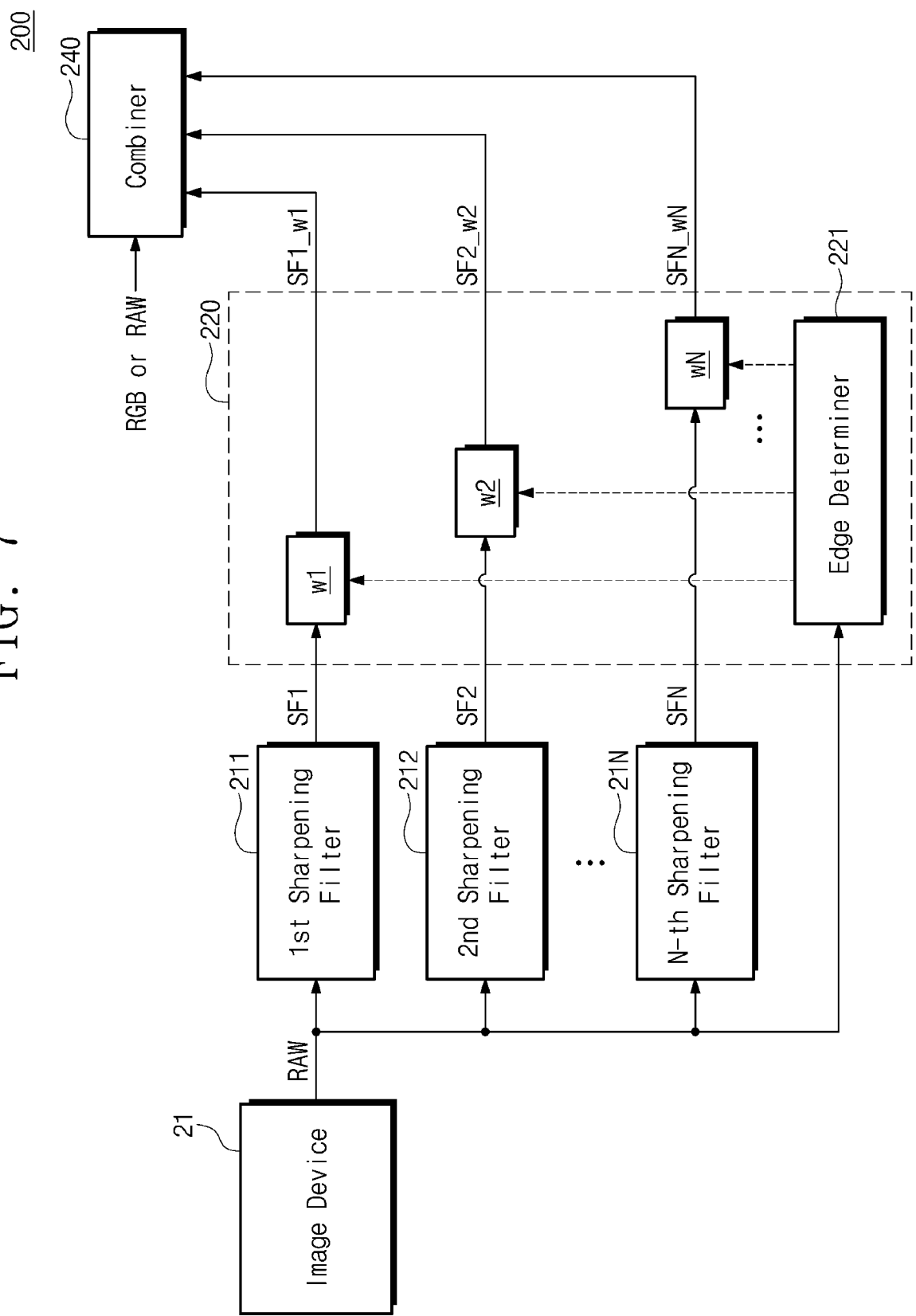
FIG. 7 is a block diagram of an image signal processor according to example embodiments of the disclosure.

FIG. 7 is a block diagram of an image signal processor according to example embodiments of the disclosure.

Referring to FIG. 7, an image signal processor 200 may include a plurality of sharpening filters 211~21N, a weight adjuster 220, and a combiner 240. For brevity of the drawings, although omitted in FIG. 7, the image signal processor 200 may further include a demosaic module configured to convert the raw data RAW into the full-color data RGB.

The plurality of sharpening filters 211~21N may each perform a filtering operation on the raw data RAW from an image device 21. The plurality of sharpening filters 211~21N may perform the filtering operations based on different filtering algorithms. For example, a first sharpening filter 211 among the plurality of sharpening filters 211~21N may perform the filtering operation on the raw data RAW based on the spatial invariant scheme. A second sharpening filter 212 among the plurality of sharpening filters 211~21N may perform the filtering operation on the raw data RAW based on the edge-preserving-filtering scheme (e.g., bilateral filter). An Nth sharpening filter 21N among the plurality of sharpening filters 211~21N may perform the filtering operation on the raw data RAW based on the edge-preserving filtering scheme (e.g., bilateral filter). At that time, the parameters (e.g., the leveling factor, and the variables of the spatial weight function and the range weight function, as described with reference to Equation 1) used in the second and Nth sharpening filters 212 and 21N may be different from each other. A plurality of sharpness data SF1~SFN output from the plurality of sharpening filters 211~21N may have different characteristics in respective ones of a plurality of regions included in one image.

An edge determiner 221 may be configured to determine the edge information of the image corresponding to the raw data RAW based on the raw data RAW and to adjust a plurality of weights w1~wN based on the determined edge information. For example, assume that the first sharpness data SF1 has high accuracy for the strong edge (where the edge strength exceeds a first reference value), the second sharpness data SF2 has high accuracy for an intermediate edge (where the edge strength is less than the first reference value and greater than a second reference value), and the Nth sharpness data SFN has high accuracy for the weak edge (where the edge strength is less than a third reference value).

At that time, when the determined edge information exceeds the first reference value, the edge determiner 221 may increase a value of the first weight w1 or may set the value of the first weight w1 to "1" and may set values of the other weights to "0". When the determined edge information is less than the first reference value and greater than the second reference value, the edge determiner 221 may increase a value of the second weight w2 or may set the value of the second weight w2 to "1" and may set the values of the other weights to "0". When the determined edge information is less than the third reference value, the edge determiner 221 may increase a value of the Nth weight wN or may set the value of the Nth weight wN to "1" and may set the values of the other weights to "0".

Accordingly, the combiner 240 may receive first weight data SF1_w1, second weight data SF2_w2, and Nth weight data SFN_wN from the weight adjuster 220.

As aforementioned, the image signal processor 200 may perform the multiple filtering operations in parallel on the raw data RAW based on the different filtering algorithms to generate the plurality of sharpness data and may adjust the plurality of weights applied to the plurality of sharpness data based on the edge information, such that the sharpness of the image may be improved.

Figure 8:
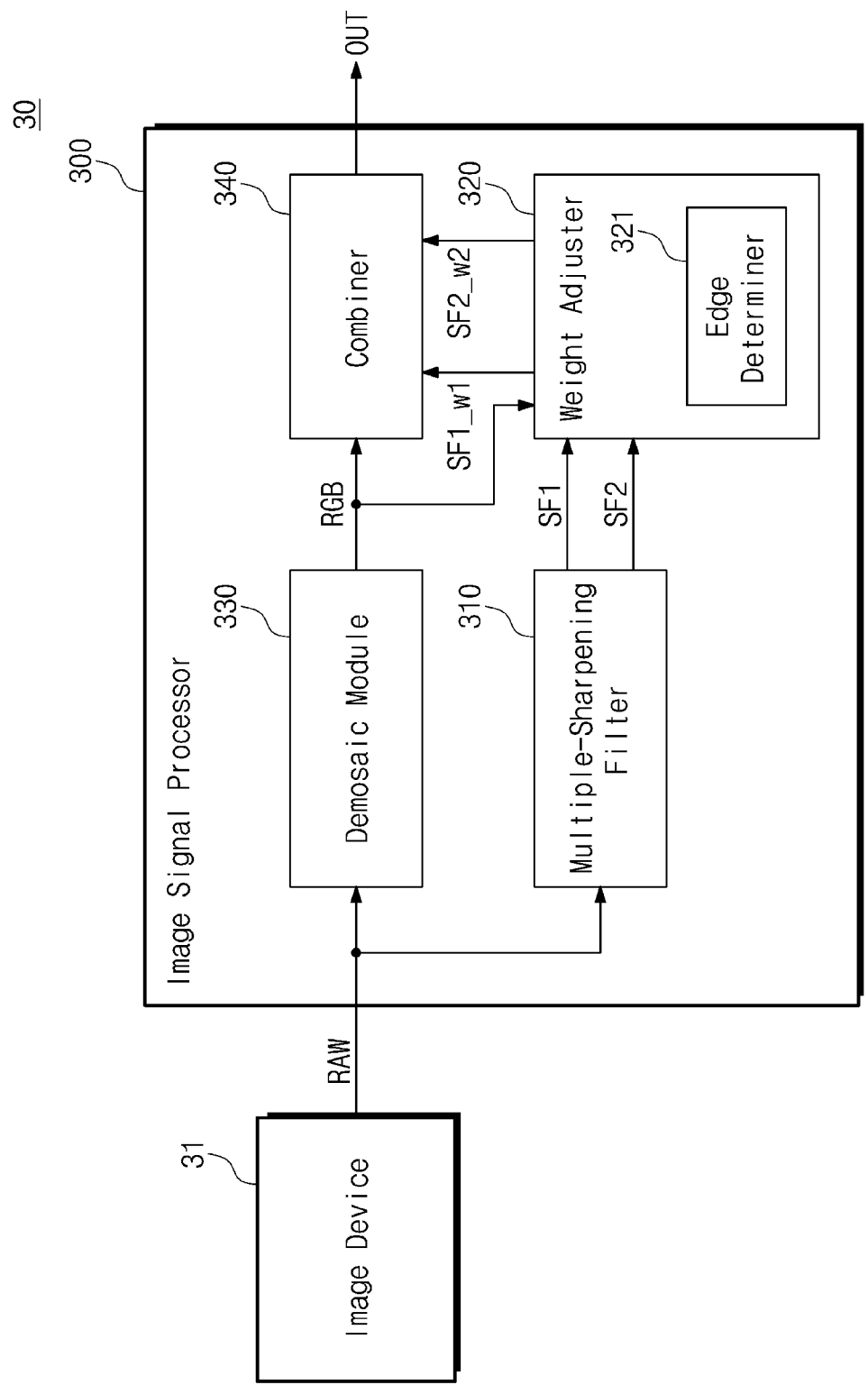
FIG. 8 is a block diagram of an image system according to example embodiments of the disclosure.

FIG. 8 is a block diagram of an image system according to example embodiments of the disclosure.

Referring to FIG. 8, an image system 30 may include an image device 31 and an image signal processor 300. The image signal processor 300 may include a multiple-sharpening filter 310, a weight adjuster 320, a demosaic module 330, and a combiner 340. The components of FIG. 8 are the same as those described above, thus detailed descriptions thereof are omitted.

The weight adjuster 320 of the image signal processor 300 may be configured to determine the edge information based on the full-color data RGB. For example, the weight adjuster 320 may include an edge determiner 321. The edge determiner 121 described with reference to FIG. 2 may determine the edge information using the raw data RAW, whereas, the edge determiner 321 shown in FIG. 8 may be configured to determine the edge information based on the full-color data RGB output from the demosaic module 330. The edge determiner 321 may be configured to adjust the weights to be applied to respective ones of the first and second sharpness data SF1 and SF2 based on the determined edge information. The scheme of adjusting the weights by the edge determiner 321 may be the same as that described above, thus detailed descriptions thereof are omitted.

The edge determiner 321 may be configured to determine the edge information using data other than the raw data RAW and the full-color data RGB. For example, the edge determiner 321 may be configured to determine the edge information based on at least one of the outputs (i.e., SF1, SF2) from the multiple-sharpening filter 310.

Figure 9:
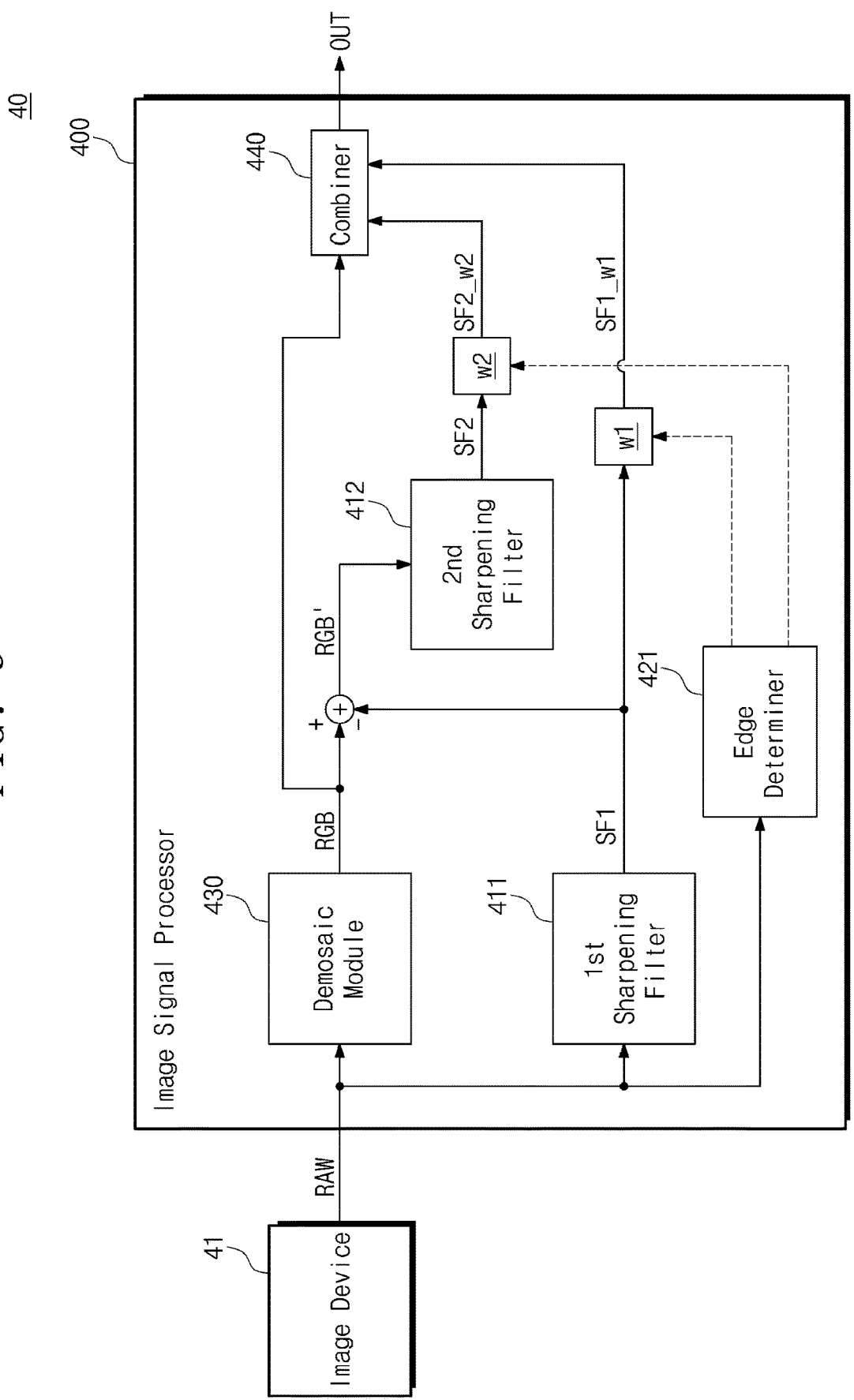
FIG. 9 is a block diagram of an image system according to example embodiments of the disclosure.

FIG. 9 is a block diagram of an image system according to example embodiments of the disclosure.

Referring to FIG. 9, an image system 40 may include an image device 41 and an image signal processor 400. The image signal processor 400 may include a first sharpening filter 411, a second sharpening filter 412, an edge determiner 421, a demosaic module 430, and a combiner 440. The components of FIG. 9 are the same as those described above, thus detailed descriptions thereof are omitted.

The first sharpening filter 411 may perform the filtering operation on the raw data RAW to generate the first sharpness data SF1. In some embodiments, the first sharpness data SF1 may have the RGB format or the YUV format. The first sharpness data SF1 may be calculated with the full-color data RGB from the demosaic module 430, thus generating a modified full-color data RGB'. For example, the modified full-color data RGB' may be the data where the first sharpness data SF1 is removed from the full-color data RGB output from the demosaic module 430. In other words, the modified full-color data RGB' may be the full-color data where the strong edge is removed.

The second sharpening filter 412 may perform the filtering operation on the modified full-color data RGB' to generate the second sharpness data SF2. In some embodiments, as aforementioned, the first and second sharpening filters 411 and 412 may perform the filtering operations on the modified full-color data RGB' based on different algorithms. In some embodiments, the first and second sharpness filters 411 and 412 may each perform the filtering operation on the overall region of the image. That is, the first and second sharpness data SF1 and SF2 may each include the information about the overall region of the image. The operations of the edge determiner 421, the first and second weights w1 and w2, and the combiner 440 are the same as those described above, and thus detailed descriptions thereof are omitted.

As aforementioned, the image signal processor 300 according to example embodiments of the disclosure may perform the multiple filtering operations on the overall region of the image based on different filtering algorithms to generate the plurality of sharpness data and may apply the plurality of weights based on the edge information of the image to respective ones of the plurality of sharpness data to generate the final output image. Thus, the image signal processor capable of improving the sharpness quality for the image with different edge strengths may be provided.

Figure 10:
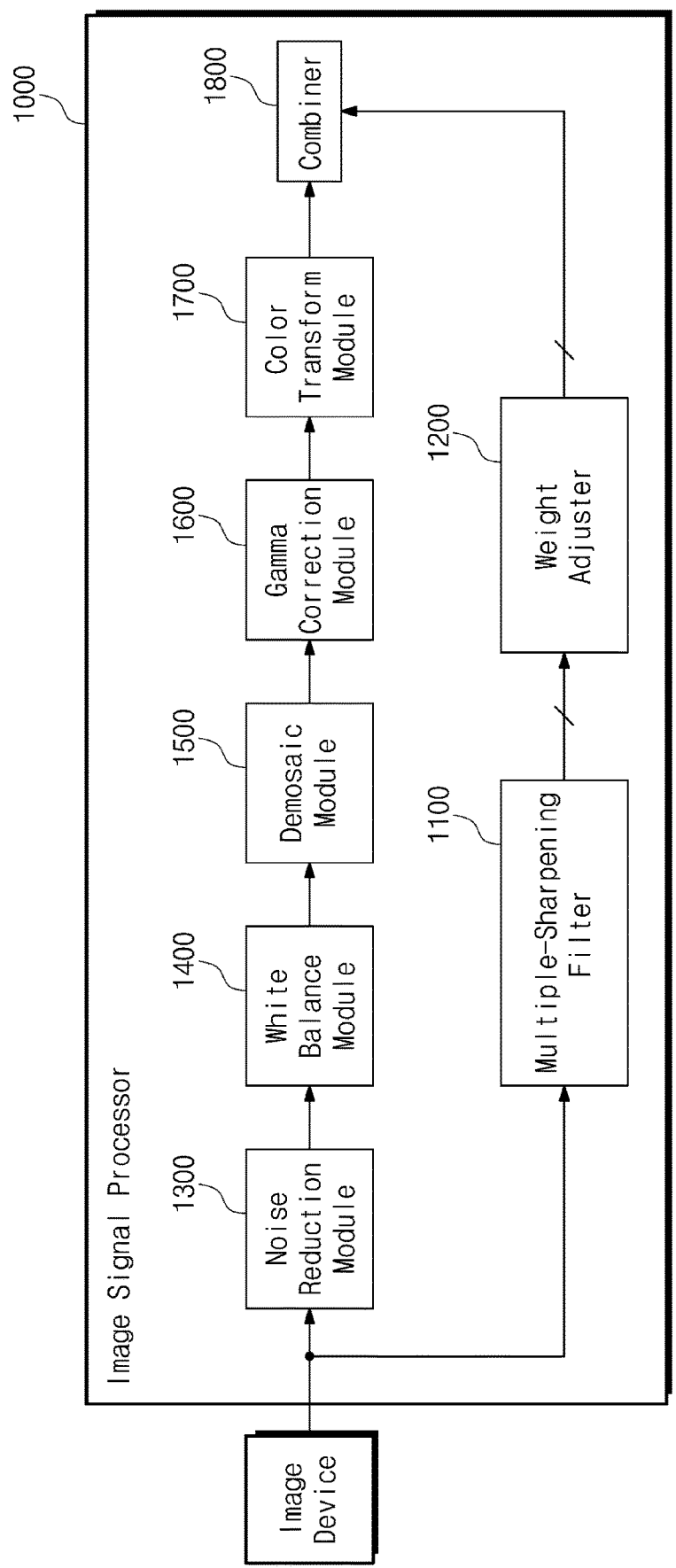
FIG. 10 is a block diagram of an image signal processor according to example embodiments of the disclosure.

FIG. 10 is a block diagram of an image signal processor according to example embodiments of the disclosure.

Referring to FIG. 10, an image signal processor 1000 may include a multiple-sharpening filter 1100, a weight adjuster 1200, a noise reduction module 1300, a white balance module 1400, a demosaic module 1500, a gamma correction module 1600, a color transform module 1700, and a combiner 1800.

The multiple-sharpening filter 1100 may perform a plurality of filtering operations based on the raw data from the image device to generate the plurality of sharpness data, as described above. The plurality of filtering operations may be the filtering operations performed based on different algorithms. The plurality of filtering operations may each perform the filtering operation on the overall region of the image based on the raw data.

The weight adjuster 1200 may determine an edge information of the image corresponding to the raw data from an image device and may adjust a plurality of weights applied to respective ones of the plurality of sharpness data based on the determined edge information. The plurality of sharpness data in which the plurality of weights are reflected may be provided to the combiner 1800.

The noise reduction module 1300 may be configured to remove noise of the raw data from the image device. For example, the noise reduction module 1300 may be configured to remove fixed-pattern noise or temporal random noise according to the color filter array CFA of the image device.

The white balance module 1400 may adjust a white balance gain for the noise-removed data.

The demosaic module 1500 may be configured to convert an output of the white balance module 1400 into the full-color data. For example, the output of the white balance module 1400 may have the data format (e.g., Bayer format) according to the color filter array CFA of the image device. The demosaic module 1500 may be configured to convert the Bayer format into the RGB format.

The gamma correction module 1600 may be configured to correct a gamma value for the image based on the output from the demosaic module 1500. The color transform module 1700 may be configured to convert an output from the gamma correction module 1600 into a specific format. For example, the output from the gamma correction module 1600 may have the RGB format. The color transform module 1700 may be configured to convert the output from the gamma correction module 1600 having the RGB format into the YUV format.

The combiner 1800 may be configured to combine the output from the color transform module 1700 with the output from the weight adjuster 1200 to output a final image.

In some embodiments, the raw data input to the multiple-sharpening filter 1100 may have the Bayer format and the plurality of sharpening weight data output from the weight adjuster 1200 may have the RGB format or the YUV format. In some embodiments, when the plurality of sharpening weight data has the RGB format, the image signal processor 1000 may further include an additional color transform module for converting the formats of the plurality of sharpening weight data.

As aforementioned, the image signal processor 1000 according to example embodiments of the disclosure may perform the multiple filtering operations on the raw data from the image device to generate the plurality of sharpness data and may adjust the plurality of weights applied to the respective ones of plurality of sharpness data based on the edge information. The plurality of filtering operations may be performed in parallel. The plurality of filtering operations may be performed in parallel with or separately from the operations of the noise reduction module 1300, the white balance module 1400, the demosaic module 1500, the gamma correction module 1600, and the color transform module 1700.

Figure 11:
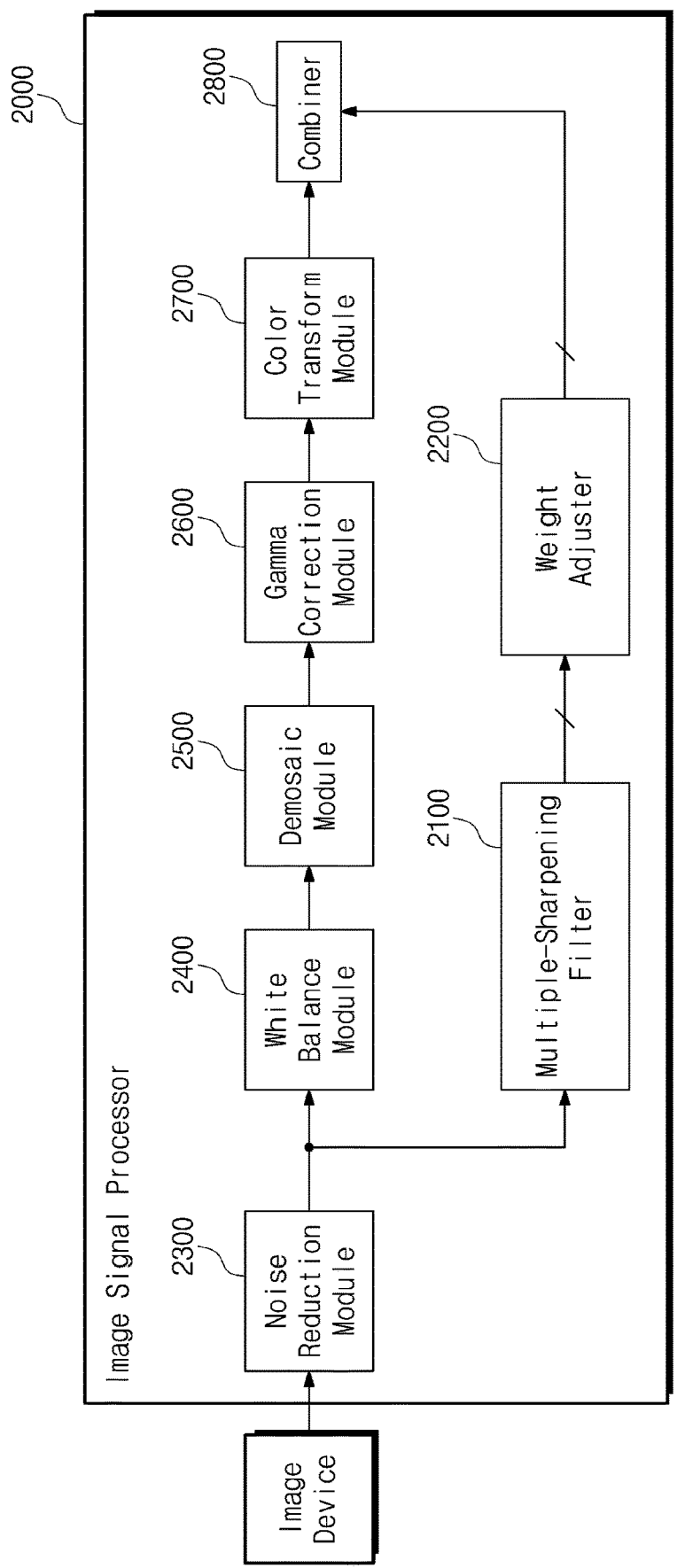
FIG. 11 is a block diagram of an image signal processor according to example embodiments of the disclosure.

FIG. 11 is a block diagram of an image signal processor according to example embodiments of the disclosure.

Referring to FIG. 11, an image signal processor 2000 may include a multi-sharpening filter 2100, a weight adjuster 2200, a noise reduction module 2300, a white balance module 2400, a demosaic module 2500, a gamma correction module 2600, a color transform module 2700, and a combiner 2800. The noise reduction module 2300, the white balance module 2400, the demosaic module 2500, the gamma correction module 2600, the color transform module 2700, and the combiner 2800 may be the same as those described with reference to FIG. 9, and thus detailed descriptions thereof are omitted.

The multi-sharpening filter 2100 may perform a plurality of filtering operations on the output (i.e., noise-reduced raw data) from the noise reduction module 2300 to generate a plurality of sharpening data. The multi-sharpening filter 2100 may operate in parallel with or separately from the white balance module 2400, the demosaic module 2500, the gamma correction module 2600, and the color transform module 2700.

In some embodiments, although it is not illustrated in the drawings, the plurality of filtering operations may be performed on the output of any of the white balance module 2400, the demosaic module 2500, and the gamma correction module 2600 to generate the plurality of sharpness data.

Figure 12:
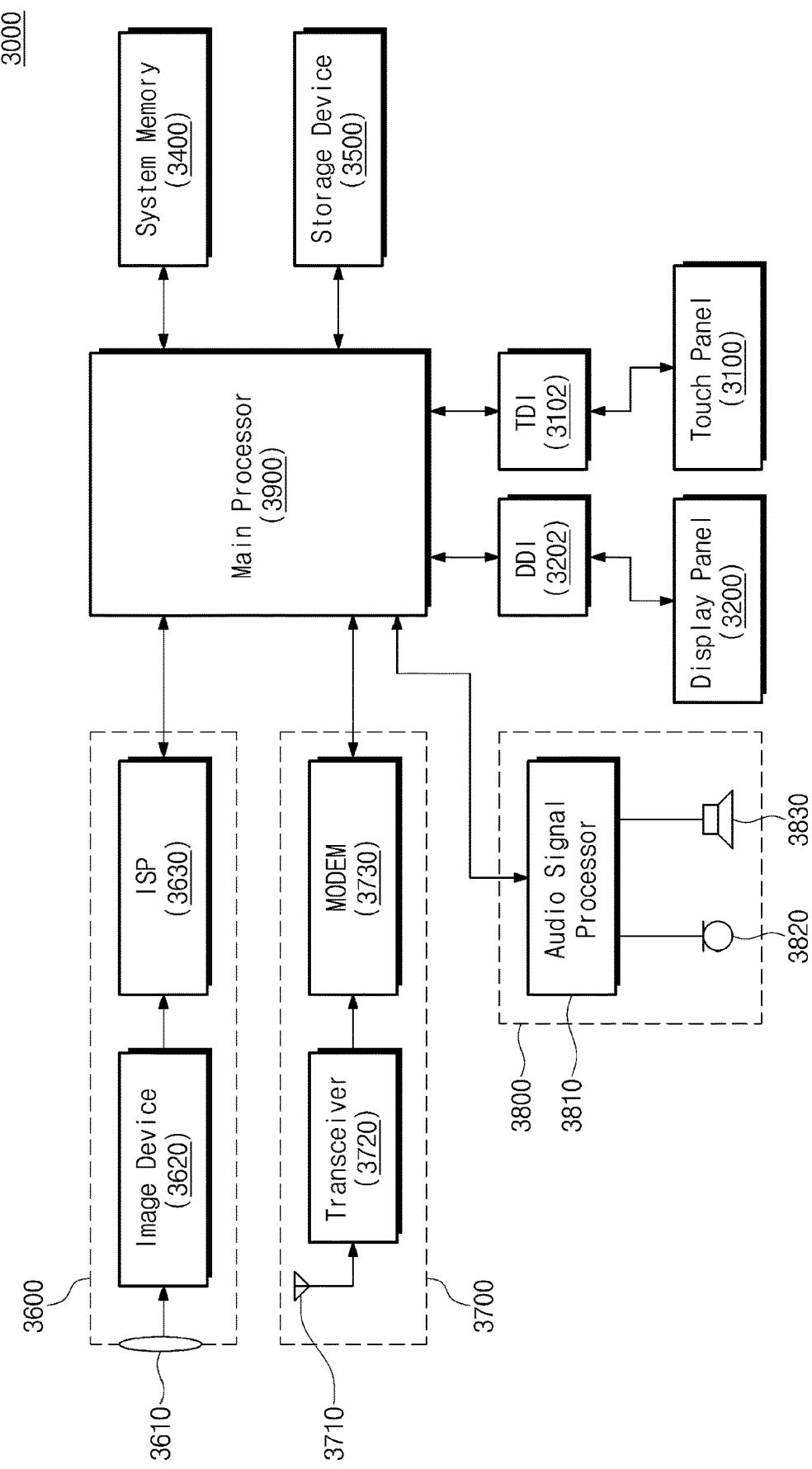
FIG. 12 is a block diagram of an electronic device including an image signal processor according to example embodiments of the disclosure.

FIG. 12 is a block diagram of an electronic device including an image signal processor according to example embodiments of the disclosure.

Referring to FIG. 12, an electronic device 3000 may include a touch panel 3100, a touch drive integrated circuit (TDI) 3102, a display panel 3200, a display driver integrated circuit (DDI) 3202, a system memory 3400, a storage device 3500, an image processor 3600, a communication block 3700, an audio processor 3800, and a main processor 3900. In some embodiments, the electronic device 3000 may be one of various electronic devices, such as a mobile communication terminal, a personal digital assistant (PDA), a portable media player (PMP), a digital camera, a smart phone, a tablet computer, a laptop computer, a wearable device, or the like.

The TDI 3102 may be configured to control the touch panel 3100. The touch panel 3100 may be configured to sense a touch pressure of a user's touch input according to the control of the TDI 3102. The DDI 3202 may be configured to control the display panel 3200. The display panel 3200 may be configured to display the image information according to the control of the DDI 3202.

The system memory 3400 may store data used for an operation of the electronic device 3000. For example, the system memory 3400 may store temporarily the data that has been processed or will be processed by the main processor 3900. The system memory 3400 may include, for example, a volatile memory, such as a static random-access memory (SRAM), a dynamic RAM (DRAM), a synchronous DRAM, and/or a non-volatile memory, such as a phase-change RAM (PRAM), a magneto-resistive RAM (MRAM), a resistive RAM (ReRAM), and a ferro-electric RAM (FRAM). In some embodiments, output data output from an image signal processor (ISP) 3630 may be stored in the system memory 3400.

The storage device 3500 may store the data regardless of power supply. The storage device 3500 may include, for example, at least one of various non-volatile memories, such as a flash memory, a PRAM, an MRAM, a ReRAM, or an FRAM. For example, the storage device 3500 may include an embedded memory and/or a removable memory.

The image processor 3600 may receive light through a lens 3610. An image device 3620 and the image signal processor 3630 included in the image processor 3600 may generate image information about an external object based on the received light. In some embodiments, the image signal processor 3630 may be the same as the image signal processor described with reference to FIG. 1 to 11 or may operate based on the method described with reference to FIGS. 1 to 11.

The communication block 3700 may exchange signals with an external device/system through an antenna 3710. A transceiver 3720 and a modulator/demodulator (MODEM) 2730 may process the signals exchanged with the external device/system according to at least one of various wireless communication standards, such as long-term evolution (LTE), worldwide interoperability for microwave access (WiMax), global system for mobile communication (GSM), code division multiple access (CDMA), bluetooth, near field communication (NFC), wireless fidelity (Wi-Fi), radio frequency identification (RFID)

The audio processor 3800 may process an audio signal using an audio signal processor 3810. The audio processor 3800 may receive an audio input through a mike 3820 and may provide an audio output through a speaker 3830.

The main processor 3900 may control the whole operation of the electronic device 3000. The main processor 3900 may control/manage operations of the components of the electronic device 3000. The main processor 3900 may process various operations to operate the electronic device 3000. In some embodiments, some of the components shown in FIG. 12 may be implemented in a form of a system-on-chip, thereby being provided as an application processor of the electronic device 3000.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been particularly shown and described with reference to exemplary embodiments thereof, it will be understood that various changes in form and details may be made therein without departing from the spirit and scope of the following claims.

What is claimed is:

1. An image signal processor comprising:
a first sharpening filter configured to perform a first filtering operation on raw data output from an external image device to output a first sharpness data;
a second sharpening filter configured to perform a second filtering operation on the raw data in parallel with the first filtering operation to output a second sharpness data;
an edge determiner configured to determine an edge strength of an image corresponding to the raw data based on the raw data and to adjust a first weight and a second weight based on the edge strength; and
a combiner configured to combine a first weight data in which the first weight is reflected in the first sharpness data and a second weight data in which the second weight is reflected in the second sharpness data to generate an output data, wherein
the first filtering operation is based on a spatial invariant filtering algorithm, and the second filtering operation is based on an edge-preserving filtering algorithm.

2. The image signal processor of claim 1, wherein the raw data has a Bayer format.

3. The image signal processor of claim 1, wherein the edge determiner is configured to:
increase the first weight or reduce the second weight when the edge strength is equal to or greater than a first reference value, and
reduce the first weight or increase the second weight when the edge strength is less than the first reference value.

4. The image signal processor of claim 1, wherein the edge determiner is configured to:
classify a plurality of regions of the image corresponding to the raw data into an edge region and a texture region, based on the edge strength; and
increase the first weight or reduce the second weight, for the edge region, and reduce the first weight or increase the second weight, for the texture region.

5. The image signal processor of claim 1, further comprising:
a demosaic module configured to convert the raw data into a full-color data, wherein
the demosaic module is configured to operate in parallel with the first and second sharpening filters.

6. The image signal processor of claim 5, wherein the combiner is configured to add the full-color data, the first weight data, and the second weight data together to generate the output data.

7. The image signal processor of claim 1, wherein the edge determiner is configured to determine the edge strength based on an edge map or a local variance about the raw data.

8. The image signal processor of claim 1, wherein:
the first sharpening filter is configured to perform the first filtering operation on all of the raw data, and
the second sharpening filter is configured to perform the second filtering operation on all of the raw data.

9. The image signal processor of claim 1, wherein the output data is stored in an external memory device.

10. An operation method of an image signal processor, the operation method comprising:
receiving a raw data from an external image device;
performing a first filtering operation on all of the raw data to generate a first sharpness data;
performing a second filtering operation on all of the raw data to generate a second sharpness data;
adjusting a first weight and a second weight based on an edge strength of an image corresponding to the raw data;
reflecting the determined first and second weights in the first sharpness data and the second sharpness data, respectively, to generate a first weight data and a second weight data; and
combining the first weight data and the second weight data to generate an output data and storing the output data, wherein
the first filtering operation is based on a spatial invariant filtering algorithm, and the second filtering operation is based on an edge-preserving filtering algorithm.

11. The operation method of claim 10, wherein in the step of adjusting the first weight and the second weight:
when the edge strength is greater than or equal to a reference value, the first weight increases or the second weight decreases, and
when the edge strength is less than the reference value, the first weight decreases or the second weight increases.

12. The operation method of claim 10, further comprising: converting the raw data into a full-color data, wherein the step of converting is performed in parallel with the first and second filtering operations.

13. The operation method of claim 12, wherein the output data is generated by adding the first and second weight data and the full-color data.

14. An electronic device comprising:
an image device configured to convert light reflected from an external object into an electrical signal to output a raw data;
an image signal processor configured to perform an image processing operation based on the raw data to output an output data; and
a system memory configured to store the output data, wherein:
the image signal processor comprises:
a demosaic module configured to convert the raw data into a full-color data;
a multiple-sharpening filter configured to perform a first filtering operation on the raw data to output a first sharpness data and perform a second filtering operation on the raw data to output a second sharpness data;
an edge determiner configured to determine an edge strength of an image corresponding to the raw data and adjust a first weight and a second weight based on the edge strength; and
a combiner configured to combine first weight data in which the first weight is reflected in the first sharpness data, a second weight data in which the second weight is reflected in the second sharpness data, and the full-color data to generate an output data, wherein
the first filtering operation is based on a spatial invariant filtering algorithm, and the second filtering operation is based on an edge-preserving filtering algorithm.

15. The electronic device of claim 14, wherein:
the multiple-sharpening filter includes a first sharpening filter and a second sharpening filter,
the first sharpening filter is configured to perform the first filtering operation to output the first sharpness data, and
the second sharpening filter is configured to perform the second filtering operation in parallel with the first filtering operation to output the second sharpness data.

16. The electronic device of claim 14, wherein:
when the edge strength is equal to or greater than a reference value, the edge determiner is configured to increase the first weight or reduce the second weight, and
when the edge strength is less than the reference value, the edge determiner configured to reduce the first weight or increase the second weight.

17. The electronic device of claim 14, wherein the edge determiner is configured to determine the edge strength based on the raw data or the first sharpness data.

18. The electronic device of claim 14, wherein the image signal processor further comprises:
a noise reduction module configured to remove noise of the raw data;
a white balance module configured to adjust a whit balance gain from an output of the noise reduction module;
a gamma correction module configured to correct a gamma value of the full-color data that is an output of the demosaic module; and
a color transform module configured to convert an output of the gamma correction module into a YUV format, wherein:
the demosaic module is configured to convert an output from the white balance module into the full-color data, and
the noise reduction module, the white balance module, the demosaic module, the gamma correction module, and the color transform module are configured to operate in parallel with the multiple-sharpening filter.

* * * * *